(12) United States Patent
Cambridge

(10) Patent No.: US 7,080,000 B1
(45) Date of Patent: Jul. 18, 2006

(54) METHOD AND SYSTEM FOR BI-DIRECTIONAL UPDATING OF ANTIVIRUS DATABASE

(75) Inventor: Rodney D. Cambridge, Middlesex (GB)

(73) Assignee: McAfee, Inc., Santa Clara, CA (US)

( * ) Notice: Subject to any disclaimer, the term of this patent is extended or adjusted under 35 U.S.C. 154(b) by 914 days.

(21) Appl. No.: 09/911,414

(22) Filed: Jul. 23, 2001

Related U.S. Application Data

(60) Provisional application No. 60/280,595, filed on Mar. 30, 2001.

(51) Int. Cl.
*G06F 13/10* (2006.01)
*G06F 13/12* (2006.01)
*G06F 12/14* (2006.01)

(52) U.S. Cl. .................. 703/21; 703/22; 713/38; 713/188; 726/22; 726/23; 726/24; 726/25

(58) Field of Classification Search ............... 703/22, 703/21; 714/38; 707/200, 203; 713/38, 713/188; 726/22–33
See application file for complete search history.

(56) References Cited

U.S. PATENT DOCUMENTS

| | | | | |
|---|---|---|---|---|
| 5,842,216 A | | 11/1998 | Anderson et al. ............. 707/203 |
| 5,948,104 A | * | 9/1999 | Gluck et al. ................... 726/24 |
| 5,999,723 A | | 12/1999 | Nachenberg ............ 395/500.43 |
| 6,029,256 A | | 2/2000 | Kouznetsov .................. 714/38 |
| 6,035,423 A | * | 3/2000 | Hodges et al. ................ 714/38 |
| 6,073,140 A | * | 6/2000 | Morgan et al. .............. 707/203 |
| 6,123,737 A | | 9/2000 | Sadowsky .................... 717/11 |
| 6,151,643 A | * | 11/2000 | Cheng et al. ................. 710/36 |
| 6,167,407 A | * | 12/2000 | Nachenberg et al. ....... 707/203 |
| 6,269,456 B1 | * | 7/2001 | Hodges et al. ................ 714/38 |
| 6,327,594 B1 | * | 12/2001 | Van Huben et al. ........ 707/200 |
| 6,560,632 B1 | * | 5/2003 | Chess et al. ................. 709/201 |
| 6,721,721 B1 | * | 4/2004 | Bates et al. .................... 707/1 |
| 6,772,346 B1 | * | 8/2004 | Chess et al. .................. 716/13 |
| 6,785,732 B1 | * | 8/2004 | Bates et al. ................. 709/232 |
| 6,952,776 B1 | * | 10/2005 | Chess .......................... 713/188 |
| 6,976,271 B1 | * | 12/2005 | Le Pennec et al. ............ 726/24 |
| 7,010,696 B1 | * | 3/2006 | Cambridge et al. .......... 713/188 |
| 2002/0174358 A1 | * | 11/2002 | Wolff et al. ................. 713/200 |
| 2004/0083384 A1 | * | 4/2004 | Hypponen .................. 713/200 |

OTHER PUBLICATIONS

"Surfing the Net for Software Engineering Notes", M. Doernhoefer, ACM SIGSOFT, Software Engineering Notes, vol. 26, No. 2 Mar. 2001.*

(Continued)

*Primary Examiner*—Fred Ferris
(74) *Attorney, Agent, or Firm*—Zilka-Kotab, PC; Christopher J. Hamaty

(57) ABSTRACT

A method for maintaining updated antivirus files within a computer network comprising at least one user computer and at least one central service computer. Each of the user computer and central service computer has an antivirus database and the network is connected to an antivirus server. The method includes receiving a new antivirus file at one of the user computer and the central service computer and updating the computer's antivirus database. The antivirus databases of the central service computer and the user computer are compared to determine if one of the databases contain new antivirus files not contained within the other database. The central service computer and the user computer are each configured to send the new antivirus files to the other of the central service computer and the user computer to update the antivirus database.

33 Claims, 5 Drawing Sheets

OTHER PUBLICATIONS

"McAfee VirusScan 4.5", Product Description, McAfee, Network Associates, Feb. 2000.*

"epolicy Orchestrator" Product Guide, Version 2.0, McAfee, Network Associates, May 2001.*

"Computer Virus-Coevolution", Nachenberg, Communications of the ACM, vol. 40, No. 1, Jan. 1997.*

"The Digital Delemma", Davis, Communications of the ACM, vol. 44, No. 2, Feb. 2001.*

* cited by examiner

| FILES | DATE UPDATED | TIME UPDATED | DAT VERSION |
|---|---|---|---|
| Antivirus_Application.exe | 6/18/01 | 1:00 pm | N/A |
| VIRUS_SIGNATURES.DAT | 6/18/01 | 1:00 pm | 4143 |
| NEW_VIRUS.DAT | 6/20/01 | 3:00 pm | N/A |

Fig. 5

METHOD AND SYSTEM FOR BI-DIRECTIONAL UPDATING OF ANTIVIRUS DATABASE

RELATED APPLICATIONS

The present application claims the benefit of U.S. Provisional Patent Application Ser. No. 60/280,595, filed Mar. 30, 2001.

BACKGROUND OF THE INVENTION

The present invention relates generally to a virus detection system and method, and more particularly, to a system and method for bi-directional updating of a virus database.

A huge surge in computer viruses has occurred in the last decade. Computer viruses have gone from an academic curiosity to a persistent, worldwide problem. Today, viruses affect vast numbers of computers in locations throughout the world. A computer virus is generally a manmade destructive computer program or code that is loaded onto a computer system without the knowledge of the user. The computer virus is often a self-replicating program containing code that explicitly copies itself and can infect other programs by modifying them or their environment. Even a simple virus can be dangerous as the virus can quickly use a large portion of the available memory and possibly bring down the computer system.

Viruses can be written for, and spread on, virtually any computing platform. A virus can infect, or become resident in almost any software component, including an application, operating system, system boot code, or device driver. Computer viruses spread by attaching themselves to other programs (e.g., word processing or spreadsheet applications) or to a boot sector of a disk. When an infected file is activated or executed, or when the computer is started from an infected disk, the virus is also executed and attempts to infect other files. Since a virus is software code, it can be transmitted along with any legitimate software that enters the computer environment. Some viruses are capable of transmitting themselves across networks and bypassing security systems. For example, a virus can spread to files on a local area network (LAN) based file server, and from there to other client systems attached to the server. Similarly, systems that run programs from wide area network (WAN) file servers can become infected if the programs on the server are susceptible to infection. In the networked world of the Internet, viruses can rapidly spread.

The term virus generally refers to any destructible or harmful program or code that attempts to hide its possibly malicious function or tries to spread onto as many computers as possible. One common type of virus is a macro virus which is encoded as a macro embedded in a document. Many applications support macro languages which allow the user to embed a macro in a document and have the macro execute each time the document is opened. Once a computer system is infected with a macro virus, the virus can embed itself in all future documents created with the associated application.

Another common virus is a boot sector virus which replaces the computer system's master boot record with its own code. The boot sector virus is a small program executed each time a computer boots. The virus infects floppy disks and hard disks by inserting itself into the boot sector of the disk, which contains code that is executed during the system boot process. Since the master boot record executes every time the computer is started, the boot sector virus can be very dangerous to the integrity of the computer system. The boot sector virus typically enters the computer system through a floppy disk installed in the floppy drive when the computer system is started.

Another type of virus, which is often difficult to detect, is a polymorphic virus. This virus produces varied but operational copies of itself. Code within the virus includes an encryption routine to help the virus hide from detection, plus a decryption routine to restore the virus to its original state when it executes.

A Trojan horse is another type of virus which masquerades as a legitimate software program. The Trojan horse generally does not replicate. It waits until its trigger event occurs and then displays a message or destroys files or disks.

A computer worm is another type of virus that can replicate itself and use memory but cannot attach itself to other programs. The computer worm is a self-contained program, or set of programs, that is able to spread functional copies of itself or its segments to other computer systems, usually via network connections. Host computer worms are entirely contained in the computer they run on and use network connections only to copy themselves to other computers. Network worms consist of multiple parts (called "segments"), each running on different machines and using the network for several communication purposes.

Many antivirus programs have become commercially available for protection against viruses. There are three main types of antivirus software: activity monitors, integrity checkers, and scanners. Activity monitoring programs attempt to prevent infection before it happens by looking for virus type activity, such as attempts to reformat a disk. Integrity checkers compute a small checksum or hash value for files which are presumably uninfected, and later compare newly calculated values with the original ones to see if the files have been modified. These programs catch unknown viruses as well as known ones. Integrity checkers may be called to check entire disks or they may be resident, checking each program that is about to be executed.

Scanners are the most widely used type of antivirus program. Virus scanners generally operate in batch mode, scanning all files on a system, hard disk, or floppy disk, when requested by the user, or at set intervals. They look for known viruses by searching disks and files for scan strings or patterns. A scanner may be designed to examine specified disks or files on demand, or it may be resident, examining each program that is about to be executed. Most scanning programs include an update feature that allows the antivirus program to download profiles of new viruses from the Internet or network resources so that the program can check for new viruses soon after they are discovered. Most scanners also include virus removers which are operable to clean infected files. One example of an antivirus scanner is McAfee's VSHIELD brand antivirus scanner.

In order to identify computer viruses, a virus-scanning engine is generally provided in combination with one or more files called antivirus data files. The virus-scanning engine scans a user's computer files by means of an evaluation of each file against the antivirus data files. The virus-scanning engine detects the viruses, and then cleans or disinfects the files and systems with an antivirus data file that has been created to counteract the damage created by the detected virus. Viruses are continuously being created that are harmful to files and systems, thus, the systems must be continuously updated with the latest antivirus data file so that the systems can be scanned and cleaned with the latest antivirus data file through virus detection programs.

Importantly, if the signature of a certain virus is not contained in any of the antivirus data files, that virus will not be detected by the virus-scanning engine. Generally, such antivirus data files are updated as new viruses are being discovered.

When a conventional system performs an update to a virus database, the application downloads the latest virus database (e.g., *.DAT or dat) files from the Internet or a network resource. For example, a computer virus scanning product such as McAfee's VIRUSSCAN or GROUPSHIELD EXCHANGE brand computer virus scanning product may be used to download the latest dat files from the Internet or from a network resource. These types of updates are referred to as 'unidirectional' updates since the update is received from a remote source and downloaded to the local computer where the update takes place. Updates to the local computer's virus database are typically scheduled to occur periodically. However, a user may also manually download updated dat files from a virus protection web site, for example, if the user suspects that his computer is infected with a new virus. A drawback to unidirectional updating is that a user may manually download a new virus file update, find a virus on his computer, and not notify a system administrator that the virus has been detected. In this case, the virus may spread throughout the network for hours or days before it is identified by the system administrator or the update is installed on the network resource and the virus is detected on other computers within the network.

There is, therefore, a need for a system and method for local computers within a network to notify the network resource of a new virus so that other local computers can be checked for the virus before it has a chance to spread throughout the network.

SUMMARY OF THE INVENTION

A method and system for maintaining updated antivirus files within a computer network are disclosed. Several inventive embodiments of the present invention are described below.

In one aspect of the invention, the method is applied to a computer network comprising at least one user computer and at least one central service computer. The user computer and central service computers each have an antivirus database and the network is connected to an antivirus server. The method includes receiving a new antivirus file at the user computer or the central service computer and updating the computer's antivirus database. The antivirus databases of the central service computer and the user computer are compared to determine if one of the databases contain new antivirus files not contained within the other database. The central service computer and the user computer are each configured to send the new antivirus files to the other of the central service computer and the user computer to update the antivirus database.

A system for maintaining updated antivirus files within a computer network generally comprises an antivirus database located on the user computer and central service computer and an antivirus database comparison application located on the user computer. The comparison application is configured to compare the antivirus databases of the central service computer and the user computer to determine if one of the databases contain new antivirus files not contained within the other database and notify the central service computer of any new antivirus files not located on the central service computer. The system further includes memory for at least temporarily storing the antivirus database. The central service computer and the user computer are each configured to send the new antivirus files to the other of the central service computer and the user computer.

In another aspect of the invention, a computer product for maintaining updated antivirus files within a computer network generally comprises computer code that receives a new antivirus file at the user computer, updates the user computer's antivirus database, and compares the antivirus databases of the central service computer and the user computer to determine if one of the databases contain new antivirus files not contained within the other database. The central service computer and the user computer are each configured to send the new antivirus file to the other of the central service computer and the user computer. The product further includes a computer readable medium that stores the computer codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

FIG. 5 is a diagram of an exemplary database contained within the computer system.

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The method and system of the present invention allow for updates to be sent from a central service computer (e.g., network server or resource) 34 to a local user computer 22 and from the local computer to the network resource. This allows the local computer 22 to notify the network resource 34 of a new virus so that other local computers on the network can be checked for the virus before it has a chance to spread throughout the network. In one embodiment, a program on a local computer 22 that has been updated with a new set of antivirus (or "dat") files checks the network resource 34 where it normally gets its updates from to determine if the network resource has an earlier set of dat files. If the program finds that the dat files from the network resource 34 are older than the dat files it has just been updated with, the program copies the newer dat files to the network resource. Thus, the local computer 22 pushes the latest dat files to the network resource 34 so that it is available to other computers on the network. This ensures that when dat updates take place on other local computers 22, the very latest dat files are available and sent throughout the network. The virus can therefore be stopped earlier and has less time to spread to other computers on the network.

Figure 1:
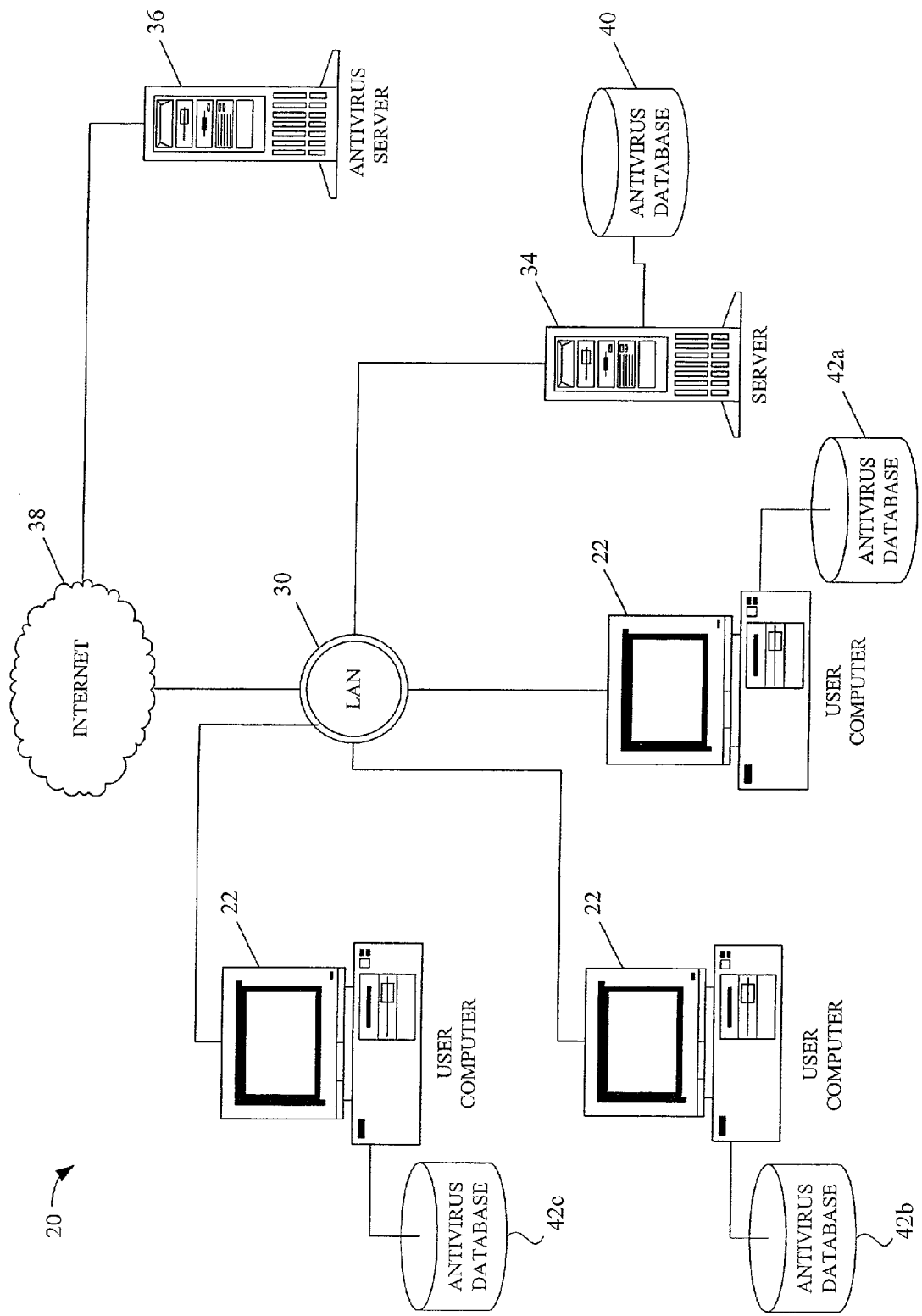
FIG. 1 is a block diagram illustrating a network system that may utilize the system and method of the present invention.

Referring now to the drawings, and first to FIG. 1, a network that may utilize the system and method of the present invention is shown and generally indicated at 20. The system includes a computer network (e.g., Local Area Network (LAN)) 30 coupled to the Internet 38. One or more user computers 22 are coupled to the computer network. Central service computer 34 is coupled to the LAN 30. An antivirus server 36 is communicatively coupled to the Internet 38. The antivirus server 36 stores a collection of virus signature files which are used to detect and cure various computer viruses. The user computers 22 and the central service computer 34 are communicatively coupled through the LAN. An antivirus data file 40 resides on the service computer 34. The antivirus data file 40 is placed on the service computer 34 and may be accessed by the user computers 22 through the operation of an executable file through the network. The user computers 22 also contain an antivirus database 42a, 42b, 42c.

The central service computer 34 may be run by a system administrator, for example. The system administrator generally configures and maintains a corporate network and its hardware and software applications. The service computer 34 may be configured, for example, to automatically receive antivirus software updates for a variety of user computers 22 on the network and automatically distribute the antivirus updates to the user computers.

The antivirus server 36 generally comprises a computer that is capable of sending and receiving information over the Internet, storing, retrieving, and maintaining antivirus files, and running various applications. The antivirus server 36 may have, for example, a packet-switched connection to the Internet 38. The antivirus server 36 may comprise a World Wide Web site having a variety of antivirus information, applications and signature files available to subscribers and may be associated with an antivirus software manufacturer, such as Network Associates, Inc., for example. The antivirus server 36 is kept up to date with the latest releases of antivirus files. For example, the virus files may be updated monthly, weekly, daily, or even hourly as new viruses are discovered, analyzed, and remedied. Once a fix for a virus is identified, a new signature may be integrated into a main virus signature file or provided as a stand-alone file until the next update of the main signature file.

It is to be understood that the computer network shown in FIG. 1 is only one example of a network that may utilize the system and method of the present invention. The computer network may be, for example, a stand-alone network (i.e., not coupled to the Internet) or an Intranet. The LAN may also be a Wide Area Network (WAN) or any other type of computer network. Also, there may be any number of user computers 22 and central service computers 40 located within the network. Furthermore, it is to be understood that the antivirus scanning of the computer may be performed on an operating system different than the one described herein and the components of the antivirus programs, arrangement of program components, or antivirus scanner may be different than described herein, without departing from the scope of the invention.

Figure 2:
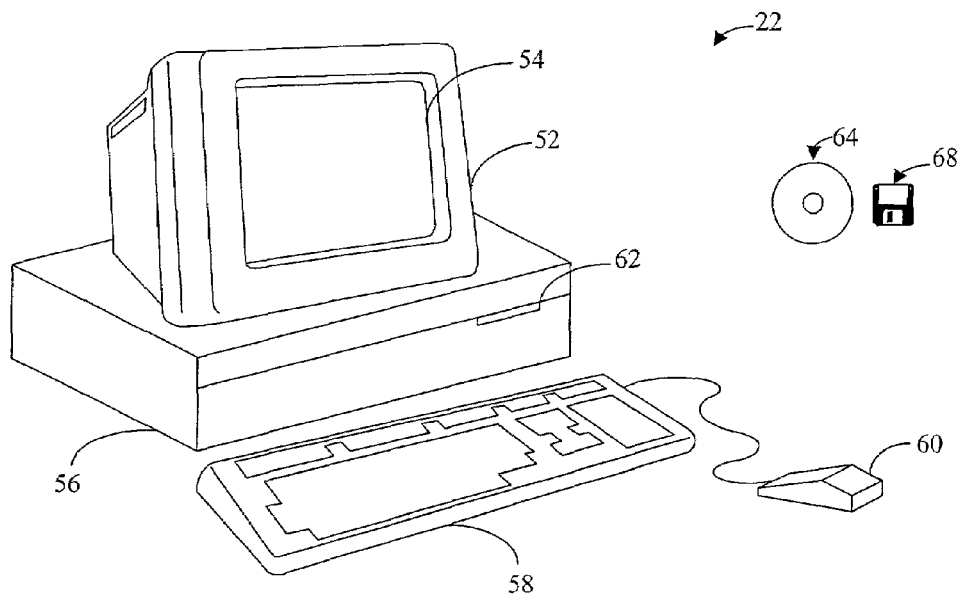
FIG. 2 is a schematic illustrating an example of a computer system that can be utilized to execute software of an embodiment of the invention.

The personal computer (computer system) 22 may be a stand-alone desktop computer, laptop computer, or a mainframe computer, for example. The personal computer 22 may be configured for use as a server or other networked computer. FIG. 2 illustrates an example of a computer system 22 that can be used to execute software of an embodiment of the invention. The computer system 22 includes a display 52, screen 54, cabinet 56, keyboard 58, and mouse 60, which may include one or more buttons for interacting with a GUI (Graphical User Interface). Cabinet 56 houses a CD-ROM drive 62, system memory 72 and fixed storage 74 (see FIG. 3) which can be utilized to store and retrieve software programs incorporating computer code that implements aspects of the invention, data for use with the invention, and the like. Although CD-ROM 64 and floppy disk 68 are shown as exemplary computer readable storage media, other computer readable storage media including tape, flash memory, system memory, and hard drive can be utilized. Additionally, a data signal embodied in a carrier wave (e.g., in a network including the Internet) can be the computer readable storage medium.

Figure 3:
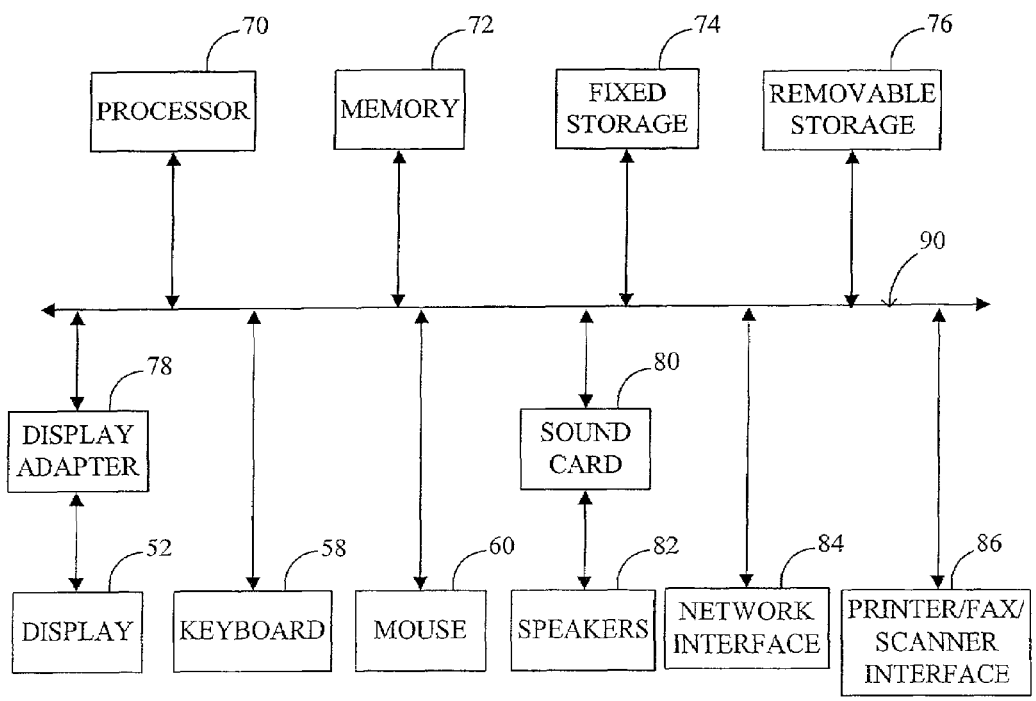
FIG. 3 is a system block diagram of the computer system of FIG. 2.

FIG. 3 shows a system block diagram of computer system 22 used to execute software of an embodiment of the invention. Computer system 22 further includes subsystems such as a central processor 70, system memory 72, fixed storage 74 (e.g., hard drive), removable storage 76 (e.g., CD-ROM drive), display adapter 78, sound card 80, transducers 82 (e.g., speakers, microphones, and the like), network interface 84, and printer/fax/scanner interface 86. Other computer systems suitable for use with the invention may include additional or fewer subsystems. For example, computer system 22 may include more than one processor 70 (i.e., a multi-processor system) or a cache memory.

The system bus architecture of computer system 22 is represented by arrows 90 in FIG. 3. However, these arrows are only illustrative of one possible interconnection scheme serving to link the subsystems. For example, a local bus could be utilized to connect the central processor 70 to the system memory 72 and display adapter 78. Computer system 22 shown in FIGS. 2 and 3 is but an example of a computer system suitable for use with the invention. Other computer architectures having different configurations or subsystems may also be utilized.

The computer system 22 may be a client computer coupled to an Internet service provider over a SLIP (Serial Line Interface Protocol) or PPP (Point to Point Protocol) connection. The Internet service provider is, in turn, coupled to the Internet, the client computer thereby having the ability to send and receive information to other nodes on the Internet using a TCP/IP protocol (Transmission Control Protocol/Internet Protocol). The computer 22 may also be a handheld computer and may be connected to the network through a wireless connection, for example.

Figure 4:
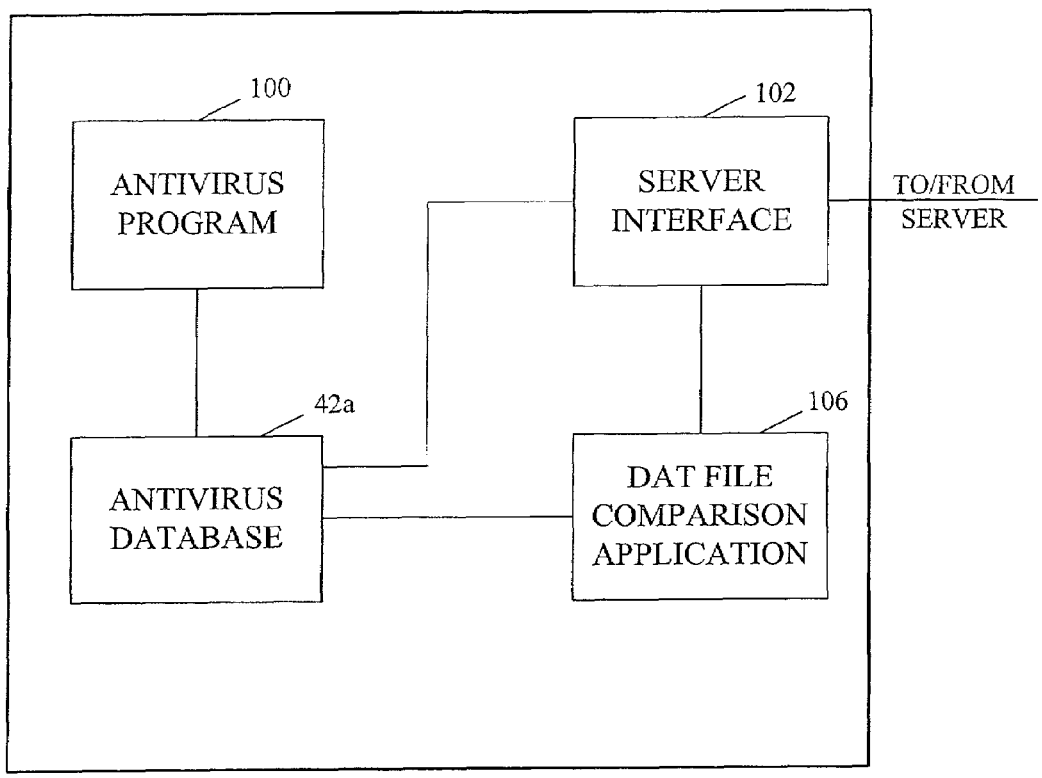
FIG. 4 is a block diagram illustrating the interaction between antivirus applications and databases located on the computer system.

FIG. 4 schematically illustrates interaction between antivirus applications and data files located on the user computer 22. The user computer 22 includes an antivirus program 100. The antivirus program may be an application such as McAfee's VSHIELD, ACTIVESHIELD, SCAN NOW or VIRUSSCAN brand programs, or antivirus applications described in U.S. Pat. No. 6,029,256, issued Feb. 22, 2000 or U.S. Pat. No. 6,035,423 issued Mar. 7, 2000, which are incorporated herein by reference, or any other suitable antivirus program. The antivirus program 100 preferably contains an update agent which is resident in the background of the personal computer system 22 and polls for updates at a set interval. For example, the program 100 may poll server 34 or 36 daily to check for new virus signature files or new scan engine libraries. Update component versions may be posted on an application server provider (ASP) page located on the Internet, which reports back whether there are newer versions of any of the listed components. This data may be displayed in a browser window which the user can log in to and download updated components. The computer 22 or service computer 34 may also receive an e-mail message informing the user that it is time to check the computer for viruses or that new viruses have been discovered. The antivirus program 100 may be installed on the personal computer 22 by a disk or CD-ROM, or downloaded directly from the Internet, for example. The antivirus program 100 uses virus definitions obtained from the antivirus database 42a to identify and fix (e.g., clean or delete infected files) viruses located on the computer (e.g., on hard drive or other temporary or permanent storage area).

An exemplary antivirus data file or cache is shown in FIG. 5 and generally indicated at 110. The file 110 is a data structure which includes a set of fields. The fields may include, for example, "Date Updated", "Time", and "DAT version". "Date Updated" refers to the last date the antivirus data file was modified. "Time" refers to the last time a file was modified. "DAT version" refers to the latest version of a main antivirus data file that was used to scan a file for computer viruses. It is to be understood that the term 'antivirus file' as used herein generally refers to a virus definition file. The file may contain a single virus definition (e.g., for a recently identified virus) or a plurality of virus definitions (e.g., old and new virus definitions used to update an antivirus database). A user may download a file that only cures a new virus, without updating the main antivirus file. For example, there may be a new virus (NEW_VIRUS-.DAT) that was recently identified but not yet incorporated in the main antivirus data file (VIRUS_SIGNATURES-.DAT). This may occur when the antivirus web site owner discovers a new virus, develops a fix for the virus, and writes its virus signature file along with data to implement the fix as a stand-alone file for distribution prior to the next release of the virus signature file. The user may also download an updated version of the main antivirus file. The antivirus data file is retrieved from either the central service computer 34 (through the server interface 102) or directly from the antivirus server 36. Files, memory, and systems that are stored on user computer 22 can be scanned for computer viruses with the antivirus program 100 upon receipt of the new antivirus data file. The antivirus program 100 may also be used to cure any identified infected files by cleaning or deleting the file, for example.

The updated antivirus files may be automatically sent to the central service computer 34 whenever it is connected to the antivirus server 36 or the service computer may be required to request updated files. A notification may be sent to the system administrator advising that new antivirus files are available and give the option to allow the downloaded files to be extracted and installed immediately or wait to install at a later time. The updates may then be supplied to the user computers 22 using push technology, as is well known by those skilled in the art.

An antivirus data file comparison application 106 is used to compare the databases 42a, 40 of the user computer 22 and the central service computer 34. It is to be understood that the code for this application may be incorporated within the antivirus program or other applications on the user computer 22. The comparison application 106 compares, for example, the date and time that the VIRUS_SIGNATURES-.DAT files were updated on each of the user computer 22 and the central service computer 34. The DAT version numbers may also be compared to determine which of the databases has the latest file. If the user computer 22 has a newer file than the service computer 34, it will notify the service computer that it has an updated version of the file. The service computer 34 may then request that the user computer 22 send the updated file to the service computer. Instead of notifying the service computer 34 and receiving a request to send the updated file, the user computer 22 may be configured to automatically send the updated file whenever it discovers that it has a newer version than the service computer. The comparison application 106 may also identify that the user computer 22 has a NEW_VIRUS.DAT file that is not contained within the database 40 of the service computer 34. As previously described, the user computer 22 will either automatically send the update to the service computer 34 or notify the service computer and wait for a request to send the new antivirus file. The comparison application 106 preferably performs a comparison of the databases 40, 42a whenever the antivirus database of the user computer 22 is updated. The comparison application 106 may first check to see where the update came from before it compares the databases 40, 42a. For example, if the update came from the central service computer 34, there is no need to perform a comparison of the databases 40, 42a. However, if the update came from a location external to the local network (e.g., from the antivirus server 36) a comparison of the databases 40, 42a is performed so that the central service computer 34 can be updated with any new antivirus files downloaded to the user computer 22.

Figure 6:
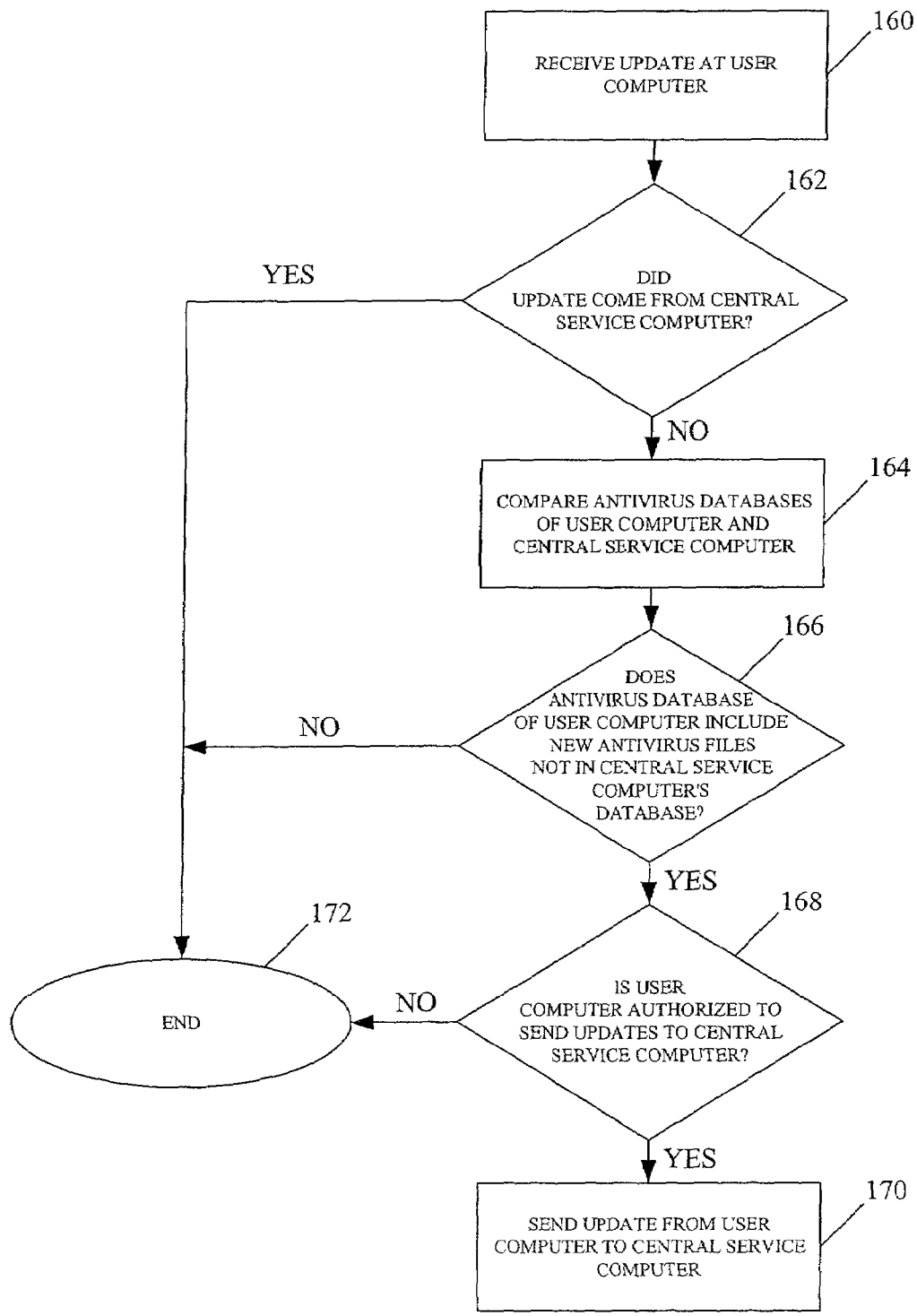
FIG. 6 is a flowchart illustrating a process of the present invention for bi-directional updating of antivirus databases.

FIG. 6 illustrates a process of the present invention. At step 160 a new antivirus file is received at the user computer 22. This new file may be an update to cover one or more new viruses (e.g., NEW_VIRUS.DAT) or a new version of the main antivirus file (e.g., VIRUS_SIGNATURES.DAT). If the update did not come from the central service computer (e.g., update came from the antivirus server 36 over the Internet), the antivirus databases 42a, 40 of the user computer 22 and central service computer 34 are compared (steps 162 and 164). If the update came from the central service computer 34, the process ends (step 172). If the antivirus database 42a of the user computer 22 includes new antivirus files (e.g., virus definitions) not contained within the central service computer's database 40 and the user computer 22 is authorized to send updates to the central service computer 34, it will send an update to the service computer (steps 166, 168, and 170). The service computer 34 can then send an update to other user computers 22 on the network so that they can use the updated database when scanning for viruses. As previously described, the user computer 22 may first notify the central service computer 34 and wait for a request, or may automatically send an update. The central service computer 34 may also compare its antivirus database 40 with the user computer's antivirus database 42a before sending updates to the user computer 22.

It will be observed from the foregoing that the method and system described herein provide numerous advantages. Importantly, the method and system allow for bi-directional updating of an antivirus database so that user computers located within a network can provide updates to a central service computer. This allows the service computer to maintain an up to date database and provide early notification to all computers on the network when a new virus is identified.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for maintaining updated antivirus files within a computer network comprising at least one user computer and at least one central service computer, the user computer and the central service computer each having an antivirus database, the network being connected to an antivirus server, the method comprising:

receiving a new antivirus file at one of the user computer and the central service computer and updating the computer's antivirus database;

comparing the antivirus databases of the central service computer and the user computer if the new antivirus file was received at the central service computer from the antivirus server or if the new antivirus file was received at the user computer from the antivirus server, in order to determine if one of the databases contain a new antivirus file not contained within the other database; and notifying the central service computer of the new antivirus data file located on the user computer, and the user computer inquiring whether to update the antivirus database with the new antivirus files;

whereby the central service computer and the user computer are each configured to send the new antivirus file to the other of the central service computer and the user computer to update the antivirus database such that the antivirus database of the central service computer is capable of being updated by the user computer and the antivirus database of the user computer is capable of being updated by the central service computer;

wherein after the central service computer is notified of the new antivirus data file located on the user computer, the user computer waits for a request from the central service computer to send the new antivirus data file;

wherein the central service computer is configured to send the new antivirus file to the user computer to update the virus database of the user computer, if is determined that the central service computer contains the new antivirus file not contained within the user computer;

wherein the user computer is configured to send the new antivirus file to the central service computer to update the virus database of the central service computer, if is determined that the user computer contains the new antivirus file not contained within the central service computer and if it is determined that the user computer is authorized to send new antivirus files to the central service computer to update the virus database of the central service computer;

wherein the central service computer is configured to periodically obtain updated antivirus files from the antivirus server.

2. The method of claim 1 wherein the computer network comprises a plurality of user computers communicatively coupled with the central service computer and antivirus server.

3. The method of claim 2 wherein the central service computer is configured to periodically send updated antivirus files to the user computers.

4. The method of claim 1 wherein the antivirus server and the central service computer are both connected to the Internet.

5. The method of claim 4 wherein the antivirus server hosts a web site on the Internet.

6. The method of claim 1 wherein the new antivirus file contains at least one new virus definition.

7. The method of claim 1 wherein the new antivirus file contains an updated version of an antivirus signature file.

8. The method of claim 7 wherein comparing the antivirus databases comprises finding the antivirus file with the latest version number.

9. The method of claim 7 wherein comparing the antivirus database comprises finding the antivirus file with the latest updated date.

10. The method of claim 1 further comprising using the new antivirus file to scan files located on the user computer and identify infected data on the computer.

11. The method of claim 10 further comprising cleaning the identified infected data on the computer using the new antivirus file.

12. The method of claim 1 further comprising notifying one of the central service computer and the user computer of the new antivirus files contained within the other of the central service computer and the user computer.

13. The method of claim 1 further comprising identifying the new antivirus file on the user computer not contained within the antivirus database of the central service computer.

14. The method of claim 13 further comprising automatically sending the new antivirus file to the central service computer.

15. The method of claim 1 wherein receiving a new antivirus file comprises receiving a new antivirus file at the user computer.

16. A system for maintaining updated antivirus files within a computer network comprising at least one user computer and at least one central service computer, the network being connected to an antivirus server configured for providing new antivirus files to the central service computer and the user computer, the system comprising:

an antivirus database located on each of the user computer and the central service computer;

an antivirus database comparison application located on the user computer and configured to compare the antivirus databases of the central service computer and the user computer if a new antivirus file was received at the central service computer from the antivirus server or if a new antivirus file was received at the user computer from the antivirus server, in order to determine if one of the databases contain a new antivirus file not contained within the other database;

the antivirus database comparison application notifying the central service computer of the new antivirus data file located on the user computer, and the user computer inquiring whether to update the antivirus database with the new antivirus files; and memory for at least temporarily storing said antivirus database;

whereby the central service computer and the user computer are each configured to send the new antivirus files to the other of the central service computer and the user computer such that the antivirus database of the central service computer is capable of being updated by the user computer and the antivirus database of the user computer is capable of being updated by the central service computer;

wherein after the central service computer is notified of the new antivirus data file located on the user computer, the user computer waits for a request from the central service computer to send the new antivirus data file;

wherein the central service computer is configured to send the new antivirus file to the user computer to update the virus database of the user computer, if is determined that the central service computer contains the new antivirus file not contained within the user computer;

wherein the user computer is configured to send the new antivirus file to the central service computer to update the virus database of the central service computer, if is determined that the user computer contains the new antivirus file not contained within the central service computer and if it is determined that the user computer is authorized to send new antivirus files to the central service computer to update the virus database of the central service computer;

wherein the central service computer is configured to periodically obtain updated antivirus files from the antivirus server.

17. The system of claim 16 wherein the computer network comprises a plurality of user computers in communication with the central service computer.

18. The system of claim 17 wherein the central service computer is configured to periodically send updated antivirus files to the user computers.

19. The system of claim 16 wherein the new antivirus file contains at least one new virus definition.

20. The system of claim 16 wherein the new antivirus file contains an updated version of virus definitions.

21. The system of claim 16 wherein the user computer further comprises an antivirus program operable to identify infected files located on the user computer and clean the infected files.

22. A computer product for maintaining updated antivirus files within a computer network comprising at least one user computer and at least one central service computer, each of the user computer and the central service computer having an antivirus database, the network being connected to an antivirus server, the product comprising:

computer code that receives a new antivirus file at the user computer and updates the user computer's antivirus database;

computer code that compares the antivirus databases of the central service computer and the user computer if the new antivirus file was received at the central service computer from the antivirus server or if the new antivirus file was received at the user computer from the antivirus server, in order to determine if one of the databases contain a new antivirus file not contained within the other database, the central service computer and the user computer each being configured to send the new antivirus file to the other of the central service computer and the user computer such that the antivirus database of the central service computer is capable of being undated by the user computer and the antivirus database of the user computer is capable of being updated by the central service computer;

computer code that notifies the central service computer of the new antivirus data file located on the user computer, and for the user computer to inquire whether to update the antivirus database with the new antivirus files; and a computer readable medium that stores said computer codes;

wherein after the central service computer is notified of the new antivirus data file located on the user computer, the user computer waits for a request from the central service computer to send the new antivirus data file;

wherein the central service computer is configured to send the new antivirus file to the user computer to update the virus database of the user computer, if is determined that the central service computer contains the new antivirus file not contained within the user computer;

wherein the user computer is configured to send the new antivirus file to the central service computer to update the virus database of the central service computer, if is determined that the user computer contains the new antivirus file not contained within the central service computer and if it is determined that the user computer is authorized to send new antivirus files to the central service computer to update the virus database of the central service computer;

wherein the central service computer is configured to periodically obtain updated antivirus files from the antivirus server.

23. The computer product of claim 22 wherein the computer readable medium is selected from the group consisting of CD-ROM, floppy disk, tape, flash memory, system memory, and hard drive.

24. The computer product of claim 22 further comprising code that scans files located on the user computer to identify infected data.

25. The computer product of claim 22 further comprising code that cleans the infected data.

26. The computer product of claim 22 further comprising code that notifies the user computer of the new antivirus files contained within the central service computer.

27. The computer product of claim 22 further comprising code that automatically sends the new antivirus file to the central service computer if it is not located with the antivirus database of the central service computer.

28. The method of claim 1, wherein the antivirus databases are compared after the new antivirus file is sent to the user computer if the new antivirus file was not sent from the central service computer.

29. The method of claim 28, wherein the databases are compared if the new antivirus file was sent from a server other than the central service computer over the Internet.

30. The method of claim 1, wherein the central service computer is at least one of a network server and a resource.

31. The method of claim 1, wherein the user computer is at least one of a local computer and a client computer.

32. The method of claim 1 wherein after the user computer sends the new antivirus file to the central service computer to update the virus database of the central service computer, the central service computer sends the new antivirus file to other user computers located on the computer network to update the virus databases of the other user computers.

33. The method of claim 1 wherein the new antivirus file includes a set of fields comprising a date updated field referring to a last date the antivirus file was modified, a time field referring to a last time the antivirus file was modified, and a DAT version field referring to a latest version of a main antivirus data file that was used to scan a file for computer viruses.

* * * * *

UNITED STATES PATENT AND TRADEMARK OFFICE
CERTIFICATE OF CORRECTION

PATENT NO. : 7,080,000 B1  Page 1 of 1
APPLICATION NO. : 09/911414
DATED : July 18, 2006
INVENTOR(S) : Rodney D. Cambridge It is certified that error appears in the above-identified patent and that said Letters Patent is hereby corrected as shown below:

col. 11, line 57 replace "undated" with --updated--.

Signed and Sealed this

Second Day of February, 2010

David J. Kappos
*Director of the United States Patent and Trademark Office*